Oct. 3, 1939.  J. R. DOWNES ET AL  2,174,873
PROCESS AND APPARATUS FOR THICKENING SLUDGE
Filed Dec. 24, 1936
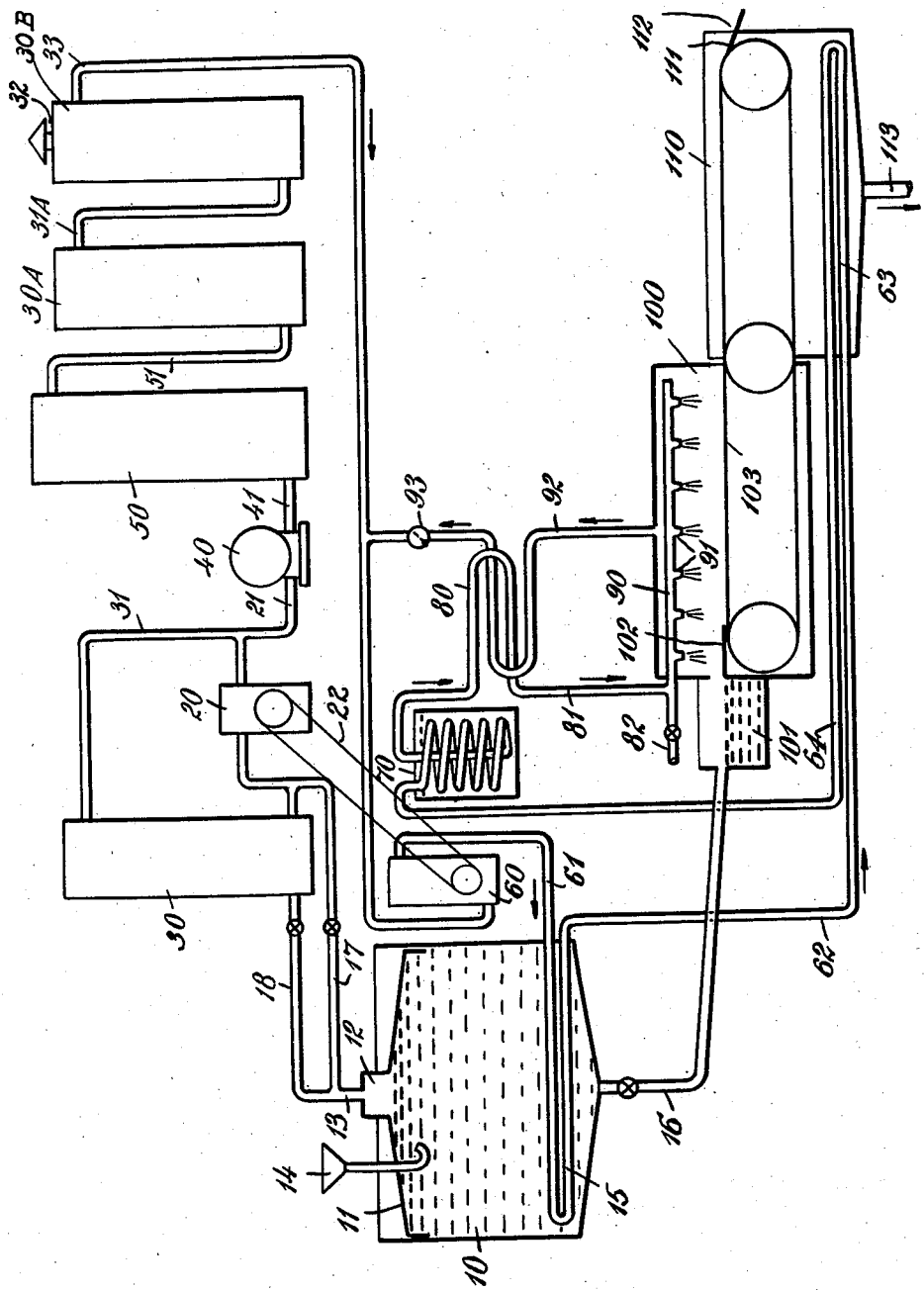
INVENTORS
John R. Downes
Thomas R. Komline
BY
Marshall E. Hawley
ATTORNEYS Patented Oct. 3, 1939

2,174,873

UNITED STATES PATENT OFFICE 2,174,873

PROCESS AND APPARATUS FOR THICKENING SLUDGE

John R. Downes, Middlesex, and Thomas R. Komline, Dunellen, N. J.

Application December 24, 1936, Serial No. 117,462

7 Claims. (Cl. 210—2)

This invention relates to improvements in process and apparatus for thickening sludge.

Its object is to provide a simple way of materially reducing the water content of the product of the digestion of sewage sludge and to utilize the gases produced by the digestion for this purpose.

Another object is to combine instrumentalities to form an apparatus for carrying out the aforesaid process.

In a sewage disposal plant with which we are familiar, the sludge produced approximates 5,000 pounds of dry solids daily in the form of five percent sludge in ninety-five percent fluids, or 100,000 pounds of liquid sludge a day. This is reduced by the process of digestion to about 60,000 pounds of five percent sludge. In this digestion 30,000 cubic feet of sludge gas is produced which is made up equally by weight of carbon dioxide and methane gases, —$CO_2$ and $CH_4$.

We have found that the water content of the five percent sludge can be materially reduced by freezing and thawing it and draining off water during the thawing process, thus reducing the water content to 65–70%.

The sludge gas given off daily during the digestion has a B. t. u. value of about 650 B. t. u. cubic feet. On this basis there is a potential energy of about 96 horsepower in this gas, obtainable with an internal combustion engine of 30 percent efficiency.

The weight of $CO_2$ in this 30,000 cubic feet of sludge gas is about 845 pounds. When all of this gas is burned either in an internal combustion engine or under boilers, about 3,385 pounds of $CO_2$ are produced, of which about seventy-five percent is recoverable in absorbers. The gases may be passed through an absorber to separate the $CO_2$ before the gas is burned, which will result in the development of the desired power (if the gas is burned in an engine) with a smaller engine.

According to our process this $CO_2$ is used to freeze the water in the five percent liquid sludge which, as we have stated, weighs about 60,000. To freeze this, its temperature has to be dropped about forty-five degrees Fahrenheit, or approximately 2,700,000 B. t. u.'s taken out of it. There is ample power in the sludge gas to do this, although it requires somewhat more work to freeze this material than it takes to freeze clear water because of its higher specific heat. When the frozen sludge is thawed out, some of the water becomes separated from it and is drained off, leaving a thicker sludge having a water content of 65–70%.

More specifically, the object of our invention is to thus separate the $CO_2$ from the gases released by digestion of sludge, to use this $CO_2$ to freeze the sludge and to drain off such of the water as is released from the frozen sludge when the latter is thawed.

These and other objects of our invention will appear in the following specification in which an apparatus which embodies the invention will be described and the way it is used pointed out and the novel features of the invention set forth in appended claims.

The drawing which forms a part of this application is a diagrammatic representation of various interconnected devices which may be used to perform our new method and to produce the desired result.

10 designates a digestion tank of known construction. 11 is a floating cover therefor, provided with a dome 12 in which the gases liberated by digestion of sewage are collected. 13 is a gas conduit from the dome 12. 14 is a sludge admission pipe in the cover 11. 15 designates heater coils in the tank 10. 16 is a valved discharge conduit from the bottom of the tank. These parts may be like those shown in Patent No. 1,717,100, issued to John R. Downes, one of the present applicants, June 11, 1929.

The gas from the dome 12 is led to an internal combustion engine 20, either directly through a valved conduit 17, or through a conduit 18, and a $CO_2$ absorption tower 30. There is enough $CH_4$ in the gas released by digestion in the tank 10 to operate the engine, but if some of the $CO_2$ is removed before the gas reaches the engine, the latter will operate more efficiently. The main purpose of the engine is to convert the gases to $CO_2$ by combustion, and to generate power, and it is to be understood that the engine is shown as an example of a simple instrumentality for this purpose. The gases may be burned in a steam boiler and the steam generated thereby used to drive a steam engine.

The gases of combustion are led through a conduit 21 to a blower 40. If the absorption tower 30 is used, its $CO_2$ discharge pipe 31 is also led to the intake of the blower. From the pump the gases are led through a conduit 41 to a scrubber 50 and from the scrubber through a conduit 51 to a $CO_2$ absorption tower 30A, through a conduit 31A to another $CO_2$ absorption tower 30B. From the latter the waste gases are discharged through an outlet 32 and the $CO_2$ is led to the apparatus which we will now describe, through a conduit 33.

60 designates a compressor, to the intake of which the conduit 33 is connected. There the $CO_2$ is raised to the desired pressure and is heated thereby. The compressor may be driven by the engine 20, as by a belt 22. The hot compressed gas is then led through conduit 61 to the heater coils 15 in the tank 10 and from the latter through conduit 62, heater coils 63 which will be described later, and through conduit 64 to a condenser 70 where the $CO_2$ is changed to a liquid. This is led through a heat exchanger 80 where its temperature is further lowered, and through conduit 81 to a shower pipe 90 within an elongated chamber 100. The pipe 90 has a plurality of jets 91 through which the liquid $CO_2$ is discharged and expanded, thus producing a freezing temperature in the chamber 100. The $CO_2$ gas is led from chamber 100 through conduit 92, heat exchanger 80, check valve 93 to condut 33 which leads it back to the condenser 70.

The digested sludge is led through conduit 16 to a receiving tank 101 from which it flows in a flat stream over a plate 102 onto a slowly moving conveyor belt 103 within the chamber 100. The layer of sludge on the belt becomes frozen. It is carried on the belt into another chamber 110 where it is thawed out. The temperature of chamber 110 is raised by the heater coils 63. The sludge is removed from the belt 103 by a scraper 111 and discharged through an opening 112. Surplus water which is removed by this operation is drained off through a pipe 113.

There is more $CO_2$ produced than is necessary to perform this operation and the surplus may be taken off in liquid condition through the valved pipe 82 and solidified, or used in any other way desired.

The volume of sludge discharged through the opening 112 is considerably less than that introduced into the chamber 100 and it is a physical condition which renders it particularly useful as a fertilizer or soil conditioner, or for fuel, and is such that it can be handled easily for final disposal by any chosen method.

What we claim is:

1. The herein described method of thickening sewage sludge which consists of freezing the sludge, thawing the frozen sludge and draining off water released from the thickened sludge by the freezing and thawing process.

2. The herein described method of thickening sewage sludge which consists of separating carbon dioxide from the sludge gas, compressing and condensing the separated carbon dioxide, using said carbon dioxide to freeze the sludge, thawing the frozen sludge and draining off water released from the thickened sludge by the freezing and thawing process.

3. The herein described method of thickening sewage sludge which consists of digesting the sludge, collecting the gases released during the digestion, burning the gases to obtain energy, using the energy as a means of refrigeration to freeze the sludge, thawing the frozen sludge and draining off water released from the thickened sludge by the freezing and thawing process.

4. The herein described method of thickening sewage sludge which consists of digesting the sludge, burning the gases released by digestion to obtain energy, separating carbon dioxide from the burnt gases, using said energy to compress and thereby heat the carbon dioxide, using the hot compressed carbon dioxide to heat the sludge during the digestion thereof, condensing the carbon dioxide, freezing the sludge by the condensed carbon dioxide, thawing the frozen sludge, draining off water released from the thickened sludge by the freezing and thawing process and utilizing the heat of the carbon dioxide before its condensation in the thawing step.

5. The herein described method of thickening sewage sludge which consists of digesting the sludge, burning the gases released by digestion in an internal combustion engine to obtain energy, separating carbon dioxide from the burnt gases, using said energy to compress the carbon dioxide, freezing the sludge by said carbon dioxide, then thawing the frozen sludge and draining off water released during the thawing process.

6. The herein described method of thickening sewage sludge which consists of digesting the sludge, separating some of the carbon dioxide from the gases released by digestion, burning the remaining gases in an internal combustion engine to obtain energy, separating more carbon dioxide from the burnt gases, using said energy to compress and thereby heat the carbon dioxide, using the hot compressed carbon dioxide to heat the sludge during the digestion thereof, condensing the carbon dioxide, freezing the sludge by the condensed carbon dioxide, then thawing the frozen sludge and draining off water released during the thawing process.

7. An apparatus for treating sewage sludge which comprises a digestion tank having a chamber for the collection of the released gases, an internal combustion engine, a conduit from said chamber to the engine, a carbon dioxide separator, an exhaust gas conduit leading from said engine to said separator, a compressor, a carbon dioxide conduit from the separator to the compressor, a condensor, a refrigerating chamber, a thawing chamber provided with a water outlet, means for passing sludge from the digestion tank through the refrigerating and thawing chambers, a heater coil associated with the digestion tank, a heater coil associated with the thawing chamber, and means for leading carbon dioxide through said heater coils and the condensor into the refrigerating chamber.

JOHN R. DOWNES.
THOMAS R. KOMLINE.